United States Patent [19]

Bjerk

[11] 4,053,162
[45] Oct. 11, 1977

[54] DYNAMIC AIR BEARING SEAL - RADIALLY AND AXIALLY STABILIZED

[75] Inventor: Roger O. Bjerk, Edelstein, Ill.

[73] Assignee: Caterpillar Tractor Co., Peoria, Ill.

[21] Appl. No.: 660,536

[22] Filed: Feb. 23, 1976

[51] Int. Cl.² .................................................. F16J 15/40
[52] U.S. Cl. .......................................... 277/75; 277/3; 277/59
[58] Field of Search ................. 277/70, 72, 75, 3, 25, 277/27, 59, 65, 34, 34.3, 34.6

[56] References Cited

U.S. PATENT DOCUMENTS

| 3,575,426 | 4/1971 | Durham | 277/59 |
| 3,815,926 | 6/1974 | Vore | 277/75 |

Primary Examiner—Robert I. Smith
Attorney, Agent, or Firm—Phillips, Moore, Weissenberger, Lempio & Majestic

[57] ABSTRACT

An air bearing is coaxially mounted around a rotatable shaft, such as an engine crankshaft, by means of a bellows-like tube or resilient material. Air flows through the tube into an air chamber partly formed by a bearing sleeve to the bearing face. The bearing sleeve is concentrically received within and spaced from a double flange thrust sleeve which is mounted on a shaft by a plurality of "O"-ring seals. A plurality of air jets in both axial and the radial direction allow co-action of both thrust sleeves by means of the air flow therebetween. Stabilizing of the seal is provided by the air jets. Small, flexible lip seals on opposite faces of the bearing sleeve are lifted away from contact with the double flange sleeve when the shaft is rotating, thereby minimizing lip seal wear. The bearing seal provides streams of air which flow past the seal to prevent oil or contaminants from moving in a direction opposite to the air flow direction.

9 Claims, 2 Drawing Figures

DYNAMIC AIR BEARING SEAL - RADIALLY AND AXIALLY STABILIZED

BACKGROUND OF THE INVENTION

This invention relates to dynamic seal assemblies of the type including air flow past the seal to prevent oil or contaminants from moving in a direction opposite to such air flow. In particular, this invention relates to an improved dynamic seal which includes a bellows-like tube of resilient material enabling movement of the seal in a radially outward direction and being radially and axially stabilized by air jets in these directions.

Internal combustion engines require efficient seals at the ends of the crankshaft. These sealing means in the form of circumscribing seals perform several functions. First, they retain oil or other lubricant in the engine's crankcase. Second, they prevent contaminants from entering the engine from the surrounding environment. Such contaminants can, of course, result in shortened engine life.

One type of seal that has been found to be effective in this environment is that shown in U.S. Pat. No. 3,575,426 assigned to the assignee hereof. With this patent device a pair of lip seal assemblies are coaxially mounted around a rotational shaft to form a chamber therebetween adapted to be pressurized by air which lifts the seal out of contact with the shaft. In this manner, continuous streams of air will flow past the seals to prevent oil or contaminants from moving in a direction opposite to such air flow. In addition, seal life is enhanced because the seals do not normally run against the surface of the shaft. When the shaft is at rest, inherent resiliency of the seals or retainer springs located radially outwardly of the lips normally effects a positive contact with the shaft to contain oil or exclude contaminants. However, the subject seal tends to be rather stiff and lacks the flexibility desired. This results in some control problems being engendered in the selection of the amount of air flow necessary to lift the lip from the shaft surface.

Another problem is engendered by the slight but rapid wobble that is encountered with the shaft, such as a crankshaft, about which the seal is placed. This wobble increases as shaft rotational speed increases and tends to break down the sealing effect of normal seals.

SUMMARY AND OBJECTS OF THE INVENTION

The primary object of this invention is to overcome the above described and other problems. The solution takes the form of a pressurized sealing arrangement comprising a dynamic seal assembly mounted about a shaft and having a flexible mounting means in the form of a bellows-like tube of resilient material. The flexible tube permits the seal to be moved in a radially outward direction away from the shaft surface. In this manner, the seal is permitted to follow shaft movement.

In addition, the sealing arrangement includes a bearing sleeve concentrically received within and spaced from a double flange thrust sleeve which is shaft-mounted by means of a plurality of "O"-ring seals. Stabilizing of the seals is provided by axially and radially directed air jets in the bearing sleeve providing air flow between the sleeves and impinging upon the thrust sleeve. During shaft rotation air flow passing between the sleeves lifts lip seals mounted on the bearing sleeve out of contact with the thrust sleeve to minimize lip seal wear.

Other objects and advantages of this invention will become more readily apparent from the following description and accompanying drawings.

DETAILED DESCRIPTION

Figure 1:
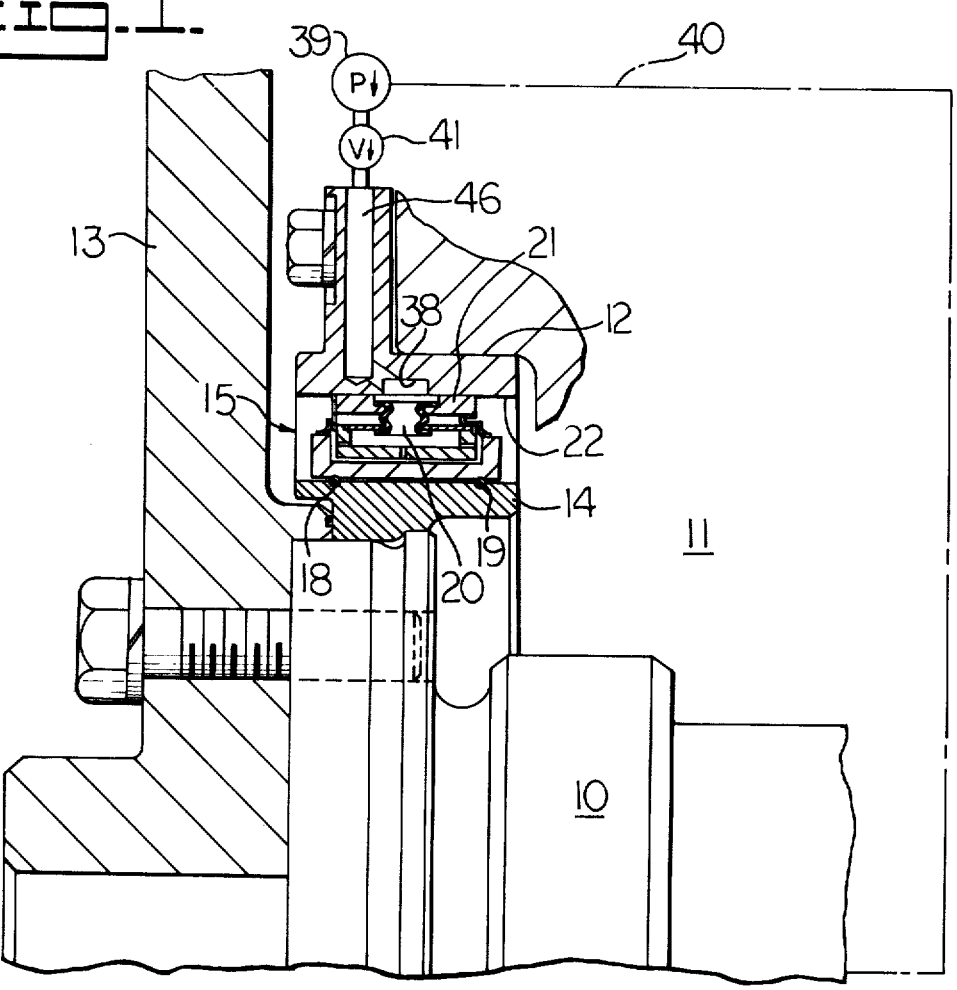
FIG. 1 is a cross-sectional view of the pressurized sealing arrangement of this invention in an engine.
Figure 2:
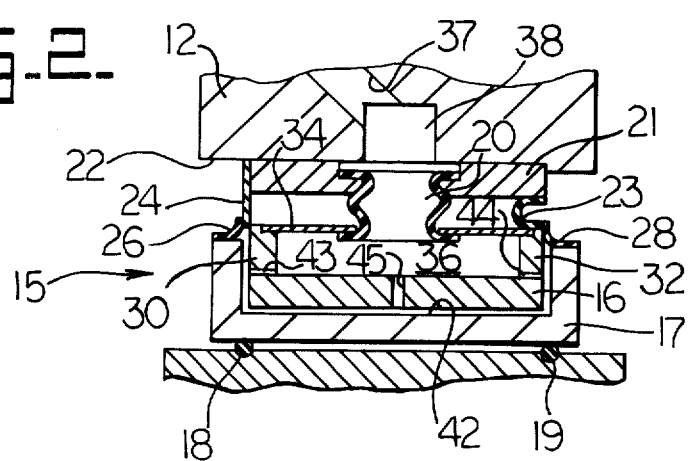
FIG. 2 is an elarged cross-sectional view of the seal assembly of FIG. 1.

FIGS. 1 and 2 of the drawing show a cross-sectional view of the pressurized sealing arrangement of this invention employed in combination with a rotary crankshaft of an internal combustion engine. Although the sealing arrangement of this invention is hereinafter described in such a combination, it should be understood that the sealing arrangement could be used in other suitable applications involving rotary shafts.

Turning now to FIG. 1, there is shown a crankshaft 10 suitably mounted for rotation in an internal combustion engine in a conventional manner. A closed crankcase oil or lubricant retaining chamber, partially shown at 11, is arranged to lubricate the crankshaft support bearings and attendant structures. A seal adapter 12 aids in defining the subject crankcase. A flywheel 13 may be press-fitted or otherwise suitably secured onto one end of the crankshaft along with a cylindrical collar 14.

A seal assembly, shown generally at 15, is coaxially mounted between the crankshaft and the housing to seal chamber 11 and to prevent ambient contaminants such as dirt or other material from passing into the engine's interior space. As best seen in FIG. 2, a generally ring-shaped inner bearing sleeve 16 of U-shaped cross-section circumscribes shaft 10. The bearing sleeve is fitted within and concentrically spaced from a like-shaped thrust bearing sleeve 17. The thrust bearing is mounted on shaft 10 by a pair of "O"-rings 18,19 of resilient material, such as rubber. Air bearing sleeve 16 is flexibly supported by a mounting member 20 in the form of a bellows-like tube of resilient material. The mounting member is, in turn, supported by an outer ring-shaped sleeve 21 which is fitted within bore 22 in seal adapter 12. The mounting member could alternatively be a porous ring of open cell foam which provides the necessary resiliency as well as permits passage of air therethrough.

An annular resilient membrane of, e.g. rubber 23, is fixed as by bonding between outer sleeve 21 and sleeve 16. In addition, a leaf-type retaining spring 24 is also fixed between these two sleeves by mounting to outer sleeve 21. The spring freely contacts sleeve 16 as shown in the figure and in conjunction with membrane 23 allows slight axial movememt of sleeve 16.

A pair of flexible lip seals 26,28 are mounted on opposite sides 30,32 of sleeve 16 at their points of contact with spring 24 and membrane 23, respectively, and normally seal with thrust sleeve 17 to prevent dirt or other contaminants from entering the seal arrangement. A closure sleeve 34 serves to define an air chamber 36 with sleeve 16. The chamber 36 is arranged to communicate with mounting member 20 and a passage 46 formed in seal adapter 12 by means of a passage 37 and an annular groove 38 also formed therein. Means 39, such as a positive displacement air pump operably connected to be driven by the engine, may be arranged to pressurize the chamber 36 for purposes hereinafter more fully described.

In operation, and with motive means 40 such as an engine operating to rotate crankshaft 10, pump 39 will be actuated automatically to communicate a pressurized fluid such as air into chamber 36 by way of passages 46 and 37 and annular groove 38. Alternatively, a purality of ports, notches, etc., could be used in lieu of the annulus. It should be understood that the pressure used will vary depending upon a number of design parameters such as bearing clearances and/or loads.

The air pressure may be constantly regulated by a valve 41 to maintain a predetermined and substantially constant pressure level in chamber 36. Such pressure will function to slightly raise bearing sleeve 16 out of contact with the inner surface 42 of thrust sleeve 17 by means of air escaping through a plurality of orifices or air jets including fore and aft axially directed jets 43,44 and radially directed jets 45. Annular lip seals 26,28 assist in containing air between the bearing and the running surface as well as prevent back flow of contaminants. Outward flow of air from jets 43,44,45 lifts seals 26,28 when the engine is running. Since the lip seals are made of resilient material such as rubber, the lip seals return to a normal sealing relationship against sleeve 17 when the engine is not running.

The air passing through the jets exits at substantially uniform rates. Since air pressure is a function of engine speed, the system advantageously provides more air flow and thus more stabilization as speed increases. This is advantageous since crankshaft wobble increases with engine speed.

It is to be understood that the foregoing description is merely illustrative of a preferred embodiment of the invention, and that the scope of the invention is not to be limited thereto, but is to be determined by the scope of the appended claims.

I claim:

1. A pressurized sealing arrangement comprising a rotatable shaft, a generally ring-shaped thrust sleeve mounted on said shaft, an outer, ring-shaped sleeve mounting a flexible mounting member, a ring-shaped inner sleeve intermediate and spaced from said thrust sleeve and said outer sleeve, said inner sleeve being supported by said mounting member and defining an air chamber therein, passage means in said mounting member intercommunicating said outer sleeve with said chamber, and a plurality of jets in said inner sleeve positioned so as to direct pressurized fluid into said thrust sleeve from said chamber and thereby cause said inner sleeve to be centered with respect to said thrust sleeve.

2. The invention of claim 1 wherein said sleeves define an axial direction parallel to said shaft and a radial direction perpendicular to said shaft, and wherein said jets include jets oriented in the radial direction and jets oriented in the axial direction.

3. The invention of claim 2 further including a pair of flexible, annular lip seals mounted on said inner sleeve for contacting said thrust sleeve so that retrograde movement of contaminants into said chamber against the flow of said fluid is prevented.

4. The invention of claim 3 wherein said inner and thrust sleeves are generally U-shaped in cross-section and wherein said inner sleeve is concentrically fitted within said thrust sleeve.

5. The invention of claim 4 wherein said jets oriented in the axial direction are positioned within radially directed arms of said inner sleeve so as to create fluid impingement on similarly radially directed arms of said thrust sleeve for axial stabilization.

6. The invention of claim 1 wherein said flexible mounting member comprises a bellows-like tube of resilient material.

7. The invention of claim 1 further including spring means between said outer sleeve and said inner sleeve for the purpose of retention.

8. The invention of claim 1 wherein said air chamber is further defined by a closure plate member mounted on said inner sleeve and wherein said mounting member is fixed to said closure plate.

9. The invention of claim 4 wherein said lip seals are mounted so as to be lifted away from contacting relation with said thrust sleeve by fluid flow through said jets.

* * * * *